United States Patent Office 2,761,777
Patented Sept. 4, 1956

2,761,777

PROCESS FOR RECOVERING AN ALKALINE EARTH METAL FROM ADMIXTURE WITH AN ALKALI METAL

Frank L. Padgitt, Martin B. Smith and Wilford H. Thomas, Baton Rouge, La., assignors to Ethyl Corporation, New York, N. Y., a corporation of Delaware No Drawing. Application December 11, 1952, Serial No. 325,455

3 Claims. (Cl. 75—101)

The present invention relates to a process for recovering alkaline earth metal values from admixture with an alkali metal, and more particularly to an improved process for recovering metallic calcium from mixtures containing sodium and calcium.

United States Patents 2,543,406 and 2,543,407 disclose processes for treating mixtures of alkaline earth metal and alkali metal so as to recover the alkaline earth metal values that are present. More specifically, the processes of these patents are directed to treating sodium and calcium mixtures such as are obtained as a by-product in the electrolytic manufacture of sodium. When preparing sodium by the electrolysis of fused sodium chloride, it is a common practice to add calcium chloride to the electrolyte for the purpose of reducing its melting point. During the electrolysis calcium metal is produced at the cathode along with sodium, and at the temperature of the cell, dissolves in the sodium. This crude sodium is purified by mechanical means so as to recover substantially pure sodium as the principal product and a residue or sludge as a by-product which contains appreciable quantities of both sodium and calcium. The calcium is present in this sludge in the form of crystals embedded in a matrix of sodium, and therefore cannot be readily recovered by conventional mechanical means. Although the composition of this sludge varies somewhat the total metal concentration averages between 90 and 95 weight per cent, and the calcium content generally averages between 15 and 30 weight per cent.

The processes which are described and claimed in the aforementioned patents for resolving mixtures of alkali metal and alkaline earth metal consist generally of treating such mixtures with various organic solvents such as the lower aliphatic alcohols. It was discovered that although both the alkali metals and the alkaline earth metals are reactive with such solvents, the alkali metals react at a much faster rate. These processes take advantage of this difference in reaction rates to effect a separation of alkali metal and alkaline earth metal. In general, the process is carried out by subjecting such mixtures to the action of such solvents, and as soon as the reaction between the solvent and alkali metal is complete, the undissolved alkaline earth metal is separated from the reaction mixture. It is apparent that if the alkaline earth metal is to be efficiently and economically recovered, the process must be conducted so that no appreciable quantity of alkaline earth metal will react. There are essentially two aspects to this difficult problem. First, it has been found that if the alkaline earth metal and solvent are in contact with each other under reaction conditions for a prolonged period, the alkaline earth metal will react; and second, as the temperature increases, the rate of reaction correspondingly increases. It has been proposed to alleviate some of this difficulty by employing relatively low reaction temperatures. Thus, when applying the process to the separation of calcium from the sodium-calcium sludge by treating the sludge with methanol, for example, reaction temperatures between —10° C. and +10° C. should be maintained in order that no substantial reaction will take place between the calcium and alcohol. This use of low reaction temperatures, however, suffers in that expensive refrigeration equipment must be employed. Another disadvantage is that the reaction rate between alkali metal and solvent is relatively slow at these low temperatures, thereby necessarily increasing the overall reaction time and prolonging the period of contact between the solvent and alkaline earth metal. Another expedient which has been proposed consists of carrying out the reaction in the presence of minor amounts of water in accordance with the latter patent mentioned above. Although this use of water allows the reaction to be carried out at somewhat elevated temperatures, it is still necessary to prevent a prolonged contact between the alkaline earth metal and the solvent. In other words, although the presence of water will render the system less sensitive, it does not completely inhibit the reaction of the alkaline earth metal so that even with water present it is advisable to take precautions that no prolonged contact time will exist.

It is, therefore, an object of our invention to provide an improved process for recovering alkaline earth metal from admixture with an alkali metal. Another and more specific object of our invention is to provide an improved process for recovering metallic calcium from admixture with sodium. A further object of our invention is to provide an improved process for treating electrolytic sludge containing sodium and calcium so as to efficiently recover metallic calcium. Still other objects of our invention will become apparent from the consideration of the following description.

The various objects of our invention are accomplished by conducting the processes of the aforementioned patents in a manner so that the alkaline earth metal is rapidly swept out of the reaction zone as soon as it has been liberated from the mixture. In this way there is no prolonged contact in the reaction zone between the alkaline earth metal and the solvent and hence little danger of losing substantial portions of the alkaline earth metal due to reaction. Because of this very short residence time within the reaction zone, the process can be conducted at somewhat elevated temperatures, and thus not only eliminate the use of refrigeration equipment but also take advantage of the high reaction rate of the alkali metal at these temperatures. In most instances the temperature within the reaction zone can be allowed to go as high as the reflux temperature of the reaction mixture. One method of carrying out the process of our invention which is especially useful in connection with the separation of calcium from sodium-calcium sludge consists of supporting the sludge upon a foraminous surface, such as a screen or perforated plate, within a reaction zone, and thereafter passing a stream of lower aliphatic alcohol downwardly through this mixture. As soon as sufficient sodium has been reacted around the individual calcium particles they are liberated from the sodium matrix and swept out of the reaction zone by the effluent stream of reaction liquid. This stream containing the liberated calcium is then cooled, and subsequently the calcium is separated therefrom by filtration or the like.

In carrying out our process we prefer to use as a solvent a lower aliphatic alcohol such as methanol, ethanol, propanol, and isopropanol, although the various butyl alcohols such as primary, secondary, and tertiary butyl alcohol can be used as can the various amyl alcohols. If desired, minor amounts of water can be mixed with the solvent as disclosed in U. S. Patent 2,543,407 so as to render the system less sensitive than is the case when substantially anhydrous alcohols are employed. When water is used in this manner, the amount should not exceed 50 weight percent based on the amount of alcohol, and good results are realized using as little as one percent water or even less. Another expedient which can be used consists of premixing the alcohol with minor amounts of an alkali metal alcoholate prior to contacting the metal mixture since it has been found that alcoholate is also effective in inhibiting reaction between alkaline earth metal and alcohol. When operating in accordance with this latter expedient, it is convenient to use the alcoholate of the alkali metal present in the mixture and the particular alcohol being employed as the solvent. The amount of alcoholate used is small and generally need not exceed 20 weight percent based on the amount of alcohol, and good results are achieved using as little as 5 percent alcoholate. Obviously, both water and alcoholate can be used simultaneously if desired. It is therefore to be understood that whenever the term "alcohol stream" is used in this specification to refer to the solvent with which the metal mixture is being treated, either pure alcohol or alcohol containing minor amounts of water and/or alcoholate is contemplated.

Although our process can be applied to any mixture containing alkali metal and alkaline earth metal, such as mixtures of sodium and calcium, sodium and magnesium, potassium and barium, and the like, it will be described primarily in relation to the recovery of calcium from the sodium-calcium sludge obtained as a by-product in the electrolytic manufacture of sodium. Our process is carried out using conventional process equipment such as a suitable reactor provided with a reflux condenser, means for feeding the metal mixture to the reactor, and means for heating the reactor and its contents as desired. Means are also provided for supporting a charge of the mixture to be treated within the reactor, and since our process requires that a stream of alcohol be passed through the mixture, the support should be in the form of a screen or perforated plate having openings sufficiently large so as to permit the passage of the liberated alkaline earth metal particles. On the other hand, the openings should be small enough to prevent the passage of large chunks or lumps of the metal mixture out of the reaction zone. For example, when the process is applied to the recovery of calcium from electrolytic sludge, a screen having openings of between 4 and 20 mesh is admirably suited as the support for the mixture. In accordance with our process the metal mixture is placed in the reactor and thereafter a stream of alcohol passed continuously downwardly through this bed or mass of mixture at a rate which is compatible with the capacity of the reflux condenser. The temperature within the reactor is maintained at about the reflux temperature of the reaction mixture, but since the calcium particles are swept out of the reaction zone as soon as they are liberated from the sodium matrix, the calcium and alcohol are exposed to reaction conditions only a very short time, thereby eliminating the danger of losing any appreciable quantities of calcium due to reaction. The product stream flowing from the reactor is cooled in a heat exchanger to about 30 to 50° C., and thereafter the calcium is separated from this product mixture by filtration, centrifugation, sedimentation, or the like.

From the above it can be seen that our process is adaptable to either continuous or batch operation, and offers particular advantages over the prior art in that the calcium and alcohol are exposed to reaction conditions only a very short time. Because of this, the process can be carried out at temperatures at or near the reflux temperature of the reaction mixture. When using methyl alcohol as the solvent the reaction temperature is usually maintained at between 65 and 75° C., with ethyl alcohol the temperature can be about 75 to 85° C., and with isopropyl alcohol the temperature can also go as high as 80° C. to 90° C. At these temperatures not only is the rate of reaction between the sodium and alcohol very rapid so as to effect a rapid liberation of calcium, but the use of extensive refrigeration equipment is eliminated so as to substantially enhance the economics of the process.

The following example, in which the parts and percentages are given on a weight basis, will serve to further illustrate the present invention.

*Example*

The apparatus consisted of a reaction vessel provided with means for continuously feeding a metal mixture to the vessel, a reflux condenser, and means for heating the vessel and its contents. A 4 mesh screen was positioned within the vessel to serve as a support for the mixture to be treated and to prevent any large masses of the mixture from being carried out of the reaction zone. Electrolytic sludge containing 70 per cent sodium, 20 per cent calcium, and 10 per cent impurities was fed to the reactor at a rate of 50 parts per hour. Methanol containing 10 per cent sodium methylate and 2 per cent water was continuously passed downwardly through the sludge in the vessel at a rate of 2020 parts per hour while maintaining a temperature between 60 and 68° C. within the reaction zone. As the calcium particles were liberated from the mixture, they were rapidly swept out of the reaction zone in the product stream. The product stream was cooled to about 40° C. in a heat exchanger and thereafter filtered so as to recover the calcium particles. Using this apparatus and procedure, 80 per cent of the calcium originally present in the sludge was recovered.

It is to be understood that the above example is given only to illustrate one specific embodiment of our invention, and other modifications will be apparent to those skilled in the art. For example, any of the other lower aliphatic alcohols such as ethanol, propanol, isopropanol, and the like can be used in place of methanol with equally good results. Similarly, although it is preferred to carry out the reaction in the presence of water and alcoholate as in the above example, either or both of these ingredients can be omitted if desired. While in the above example a downward flow of solvent was employed to sweep the calcium particles out of the reaction zone, it is apparent that other equivalent means can be employed. For example, a horizontal reactor can be employed wherein the alcohol is forced through the metal mixture at a rate sufficient to entrain the liberated calcium particles and sweep them out of the reaction zone. Similarly, the alcohol can be forced upwardly through a bed of metal mixture at a rate sufficient to carry the liberated calcium out of the reaction zone in an overhead stream. We, therefore, intend by the appended claims to cover all modifications falling within the spirit and scope of our invention.

We claim:

1. A process for recovering unreacted alkaline earth metal particles from a mixture in which they are embedded in larger masses of alkali metal, said process comprising applying the mixture against a foraminous surface having openings large enough to pass the alkaline earth particles but not large enough to pass the larger masses, contacting the mixture with a liquid stream of an aliphatic alcohol having up to five carbon atoms per molecule and containing up to about 20 weight per cent of the alcoholate of the alkali metal, the contacting temperature being kept at about the reflux temperature of the stream so as to cause the alkali metal to react with the alcohol and liberate the alkaline earth metal particles and to cause the liberated particles to promptly pass through the openings with the alcohol, and separating the liberated particles from the passed alcohol.

2. The process of claim 1 in which the alcohol stream also contains up to 50 weight per cent of water.

3. The process of claim 1 in which the mixture is electrolytic sodium sludge and the foraminous surface is a screen having openings between 4 and 20 mesh.

References Cited in the file of this patent

UNITED STATES PATENTS

| | | |
|---|---|---|
| 1,943,330 | Mitchell | Jan. 16, 1934 |
| 2,009,667 | Keyes | July 30, 1935 |
| 2,543,406 | Hill | Feb. 27, 1951 |
| 2,561,862 | Hill | July 24, 1951 |

OTHER REFERENCES

Comptes rendus hebdomadaires des Seances de l'Acadamie des Sciences, vol. 126, pages 1756–1757 (1898).